(12) United States Patent
Chakraborty et al.

(10) Patent No.: US 10,674,498 B2
(45) Date of Patent: Jun. 2, 2020

(54) ACCELERATED CELL ACTIVATION IN WIRELESS COMMUNICATION

(71) Applicant: QUALCOMM Incorporated, San Diego, CA (US)

(72) Inventors: Kaushik Chakraborty, San Diego, CA (US); Rahul Malik, San Diego, CA (US); Srinivas Yerramalli, San Diego, CA (US); Tamer Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 30 days.

(21) Appl. No.: 16/157,869

(22) Filed: Oct. 11, 2018

(65) Prior Publication Data
US 2019/0116585 A1 Apr. 18, 2019

Related U.S. Application Data

(60) Provisional application No. 62/571,661, filed on Oct. 12, 2017.

(51) Int. Cl.
H04W 72/04 (2009.01)
H04W 52/02 (2009.01)
H04L 5/00 (2006.01)
H04W 76/15 (2018.01)
H04W 36/00 (2009.01)
H04W 24/10 (2009.01)

(52) U.S. Cl.
CPC ........... *H04W 72/042* (2013.01); *H04L 5/001* (2013.01); *H04L 5/0048* (2013.01); *H04L 5/0098* (2013.01); *H04W 52/0235* (2013.01); *H04W 76/15* (2018.02); *H04W 24/10* (2013.01); *H04W 36/0069* (2018.08); *H04W 52/02* (2013.01)

(58) Field of Classification Search
None
See application file for complete search history.

(56) References Cited

U.S. PATENT DOCUMENTS 9,432,156 B2 * 8/2016 Kim .................. H04L 5/003
9,763,265 B2 * 9/2017 Kazmi ................ H04L 1/1887
(Continued)

FOREIGN PATENT DOCUMENTS

EP 3152944 A1 4/2017

OTHER PUBLICATIONS

International Search Report and Written Opinion—PCT/US2018/055592—ISA/EPO—dated Jan. 22, 2019.

*Primary Examiner* — Michael J Moore, Jr.
(74) *Attorney, Agent, or Firm* — Loza & Loza, LLP/Qualcomm

(57) ABSTRACT

Aspects of the present disclosure provide various procedures and methods for accelerated secondary cell (SCell) activation when carrier aggregation (CA) is configured. A scheduling entity receives, from a network entity, an indication of anticipated data for a user equipment (UE) in an idle mode. The scheduling entity determines supplemental wake-up information based on the carrier aggregation capability of the PCell. The scheduling entity transmits a wake-up message to the UE. The wake up message is configured to cause the UE to wake up in a CA configuration using the PCell and one or more SCells, based on the supplemental wakeup information.

30 Claims, 13 Drawing Sheets

(56) References Cited

U.S. PATENT DOCUMENTS

| | | | |
|---|---|---|---|
| 10,123,314 B2* | 11/2018 | Jang | H04W 24/02 |
| 10,205,582 B2* | 2/2019 | Qiu | H04W 16/32 |
| 2013/0237208 A1* | 9/2013 | Vujcic | H04B 7/15507 |
| | | | 455/418 |
| 2014/0029514 A1 | 1/2014 | Yu et al. | |
| 2014/0133428 A1* | 5/2014 | Kazmi | H04L 5/0098 |
| | | | 370/329 |
| 2015/0078286 A1* | 3/2015 | Kim | H04L 1/18 |
| | | | 370/329 |
| 2015/0163801 A1* | 6/2015 | Sadek | H04W 72/0446 |
| | | | 370/336 |
| 2016/0043843 A1 | 2/2016 | Liu et al. | |
| 2016/0183263 A1 | 6/2016 | Liu et al. | |
| 2016/0270071 A1 | 9/2016 | Dinan et al. | |
| 2016/0302203 A1* | 10/2016 | Liu | H04L 5/001 |
| 2017/0230893 A1 | 8/2017 | Miao et al. | |
| 2018/0007731 A1 | 1/2018 | Park et al. | |
| 2018/0020503 A1 | 1/2018 | Deenoo et al. | |
| 2019/0037634 A1* | 1/2019 | Kadiri | H04W 12/00 |

* cited by examiner

ACCELERATED CELL ACTIVATION IN WIRELESS COMMUNICATION

PRIORITY CLAIM

This application claims priority to and the benefit of U.S. provisional patent application No. 62/571,661 filed in the United States Patent and Trademark Office on Oct. 12, 2017, the entire content of which is incorporated herein by reference as if fully set forth below in its entirety and for all applicable purposes.

TECHNICAL FIELD

The technology discussed below relates generally to wireless communication systems, and more particularly, to carrier aggregation with accelerated secondary cell activation.

INTRODUCTION

In wireless communication, carrier aggregation (CA) has been used to meet the increasing demand for higher bandwidth and data rates. When CA is configured, two or more carriers are bundled, joined, or aggregated to increase the bandwidth provided to a certain user equipment (UE). Each aggregated carrier may be referred to as a component carrier (CC). The individual CCs may have the same bandwidth or different bandwidths. In some CA configurations, the number of CCs may be different in downlink (DL) and uplink (UL). In some examples, the CCs are contiguous within a same operating frequency band (i.e., intra-band contiguous). In other examples, the CCs may be non-contiguous in frequency. When non-contiguous CCs are all located in the same frequency band, they are called intra-band CCs. When non-contiguous CCs are located in different bands, they are called inter-band CCs. When CA is configured, a UE has a connection with a primary cell and one or more secondary cells. The primary cell (PCell), also called an anchor cell, provides a radio resource control (RRC) connection to the UE. Each secondary cell (SCell) connects to the UE via a corresponding CC.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide various procedures and methods for accelerated secondary cell activation in wireless communication.

One aspect of the disclosure provides a method of wireless communication at a scheduling entity of a primary cell (PCell). The scheduling entity transmits carrier aggregation (CA) capability information to a user equipment (UE). The scheduling entity further transmits to the UE secondary cell (SCell) pre-configuration information for facilitating an accelerated SCell activation procedure based on the CA capability information of the UE. The scheduling entity further transmits to the UE a control message to initiate the accelerated SCell activation procedure to establish a connection between the UE and one or more SCells. The scheduling entity further controls the SCells to transmit respective UE-specific reference signals based on the SCell pre-configuration information. The scheduling entity further receives, from the UE, a measurement report of the UE-specific reference signals indicating a preference of one or more SCells for a CA configuration.

Another aspect of the disclosure provides a method of wireless communication at a user equipment (UE). The UE receives, from a PCell, SCell pre-configuration information specifying time-frequency resources allocated to reference signals of one or more SCells for an accelerated SCell activation procedure. The UE further receives, from the PCell, a control message to initiate the accelerated SCell activation procedure to establish a connection with the one or more SCells in a CA configuration. The UE measures the reference signals received using the time-frequency resources specified in the SCell pre-configuration information. The UE further transmits, to the PCell, a measurement report of the reference signals indicating one or more preferred SCells for the CA configuration.

Another aspect of the disclosure provides a scheduling entity of a PCell for wireless communication. The scheduling entity includes a communication interface, a memory, and a processor operatively coupled with the memory and the communication interface. The communication interface is configured to communicate with a UE. The processor and the memory are configured to transmit CA capability information to the UE. The processor and the memory are further configured to transmit, to the UE, SCell pre-configuration information for facilitating an accelerated SCell activation procedure based on the CA capability information of the UE. The processor and the memory are further configured to transmit, to the UE, a control message to initiate the accelerated SCell activation procedure to establish a connection between the UE and one or more SCells. The processor and the memory are further configured to control the SCells to transmit respective UE-specific reference signals based on the SCell pre-configuration information. The processor and the memory are further configured to receive, from the UE, a measurement report of the UE-specific reference signals indicating a preference of one or more SCells for a CA configuration.

Another aspect of the disclosure provides a UE for wireless communication. The UE includes a communication interface for wireless communication, a memory, and a processor operatively coupled with the memory and the communication interface. The processor and the memory are configured to receive, from a PCell, SCell pre-configuration information specifying time-frequency resources allocated to reference signals of one or more SCells for an accelerated SCell activation procedure. The processor and the memory are further configured to receive, from the PCell, a control message to initiate the accelerated SCell activation procedure to establish a connection with the one or more SCells in a carrier CA configuration. The processor and the memory are further configured to measure the reference signals received using the time-frequency resources specified in the SCell pre-configuration information. The processor and the memory are further configured to transmit, to the PCell, a measurement report of the reference signals indicating one or more preferred SCells for the CA configuration.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
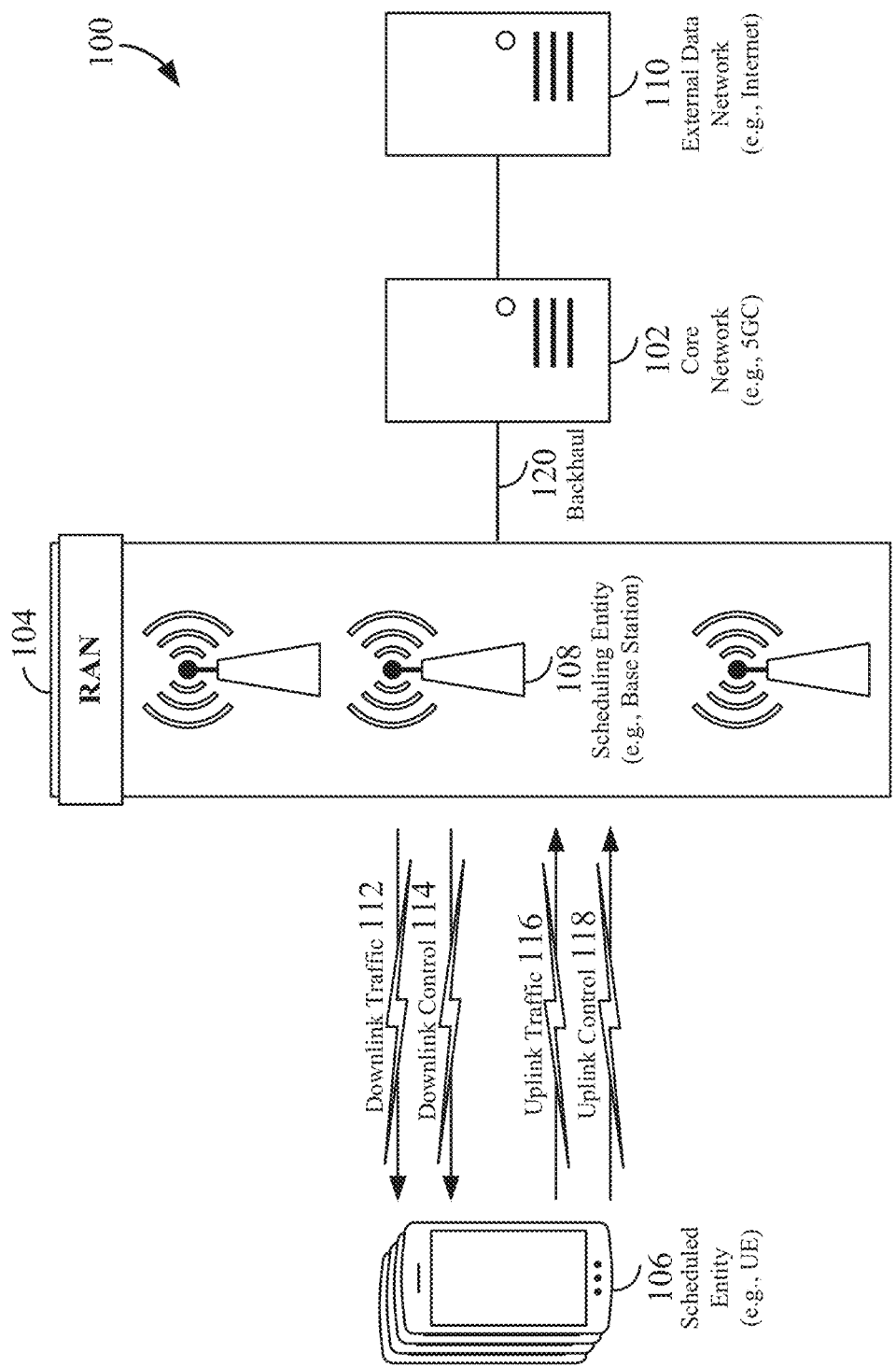
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Next generation wireless networks like 5G New Radio (NR) are expected to provide various enhancements to current wireless network standards such as 3G and 4G networks. In 5G NR, carrier aggregation may utilize component carriers in the same frequency band and/or different bands. In some examples, the component carriers may include licensed bands and unlicensed bands. Some non-limiting examples of licensed bands are 5G and 4G network licensed bands. Some non-limiting examples of unlicensed bands are Wi-Fi, using industrial, scientific, and medical (ISM) bands and Unlicensed National Information Infrastructure (U-NII) bands.

In some aspects of the disclosure, some carrier aggregation (CA) configurations may use sub-6 GHz carriers and above-6 GHz carriers such as millimeter wave (mmW) carriers. A primary cell (PCell) or anchor cell may configure CA to offload data traffic to one or more component carriers, each of which corresponds to a secondary cell (SCell). In particular, a mmW component carrier (CC) can provide a large bandwidth to handle large bandwidth applications. Millimeter-wave generally refers to high frequency bands above 24 GHz, which can provide a very large bandwidth relative to the sub-6 GHz bands. In some aspects of the disclosure, a user equipment (UE) may camp on a low band (e.g., sub-6 GHz) PCell, and the network may opportunistically activate one or more SCells when there is a large amount of data destined to the UE. In general, the reconfiguration, activation, deactivation, addition, and removal of SCells/CCs are performed by the PCell through, for example, RRC signaling or MAC control element signaling.

Aspects of the present disclosure provide various procedures and methods for accelerated SCell activation when CA is configured. While mmW SCell is used in illustrative examples, the procedures and devices described in the present disclosure may be applied with other SCells that do not use mmW component carriers. In some examples, the PCell may use a carrier in an unlicensed band while the mmW SCells may use carriers in a licensed band. Other combinations of licensed and unlicensed bands are not precluded.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106). In some examples, the scheduling entity 108 may configure a UE 106 to use carrier aggregation (CA).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
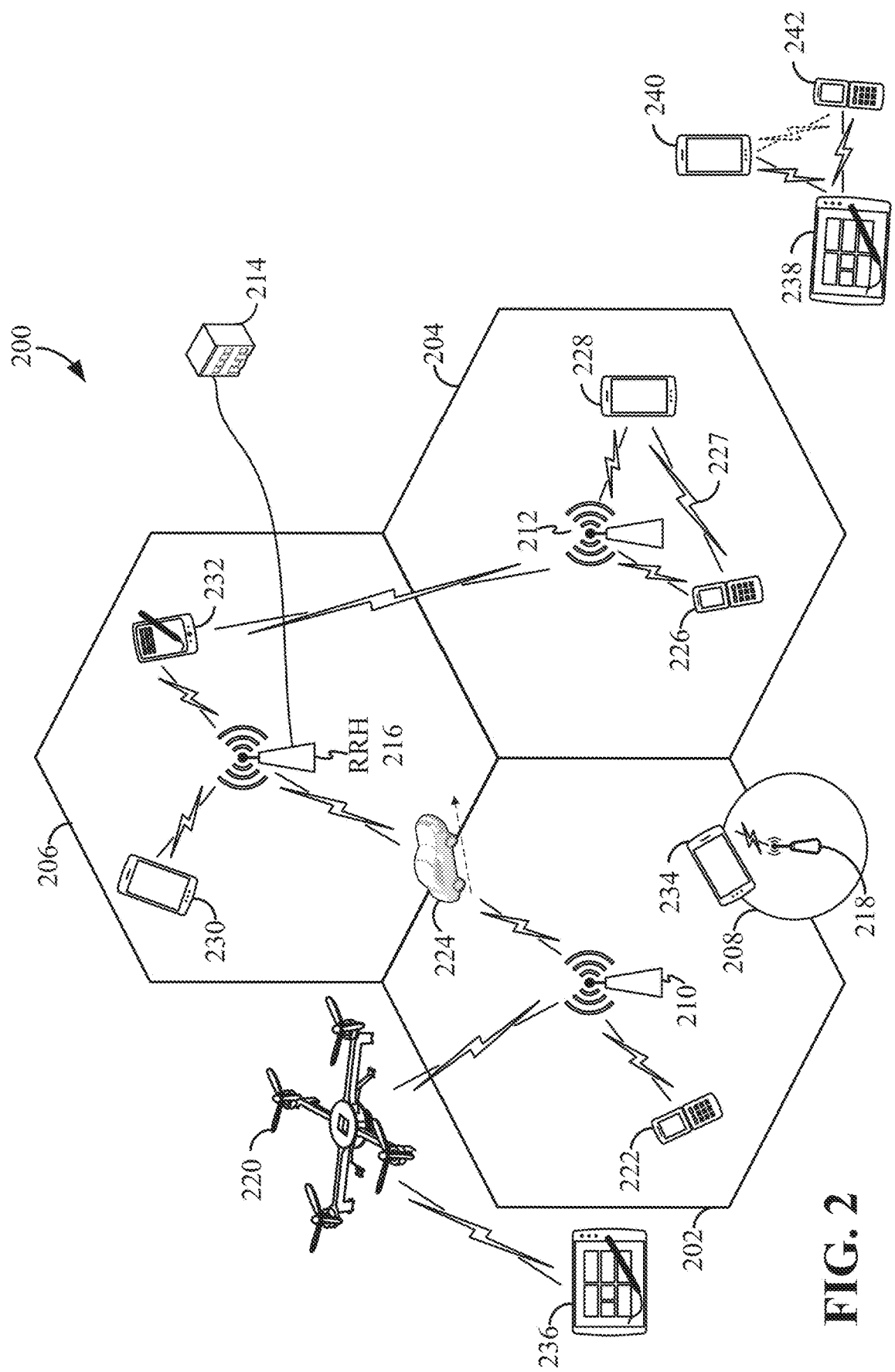
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1. In some examples, a UE 232 may connect to a PCell (e.g., cell 206) and one or more SCells (e.g., 204) using a carrier aggregation configuration.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G NR, user data may be coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), spatial multiplexing, or other suitable multiplexing schemes.

Figure 3:
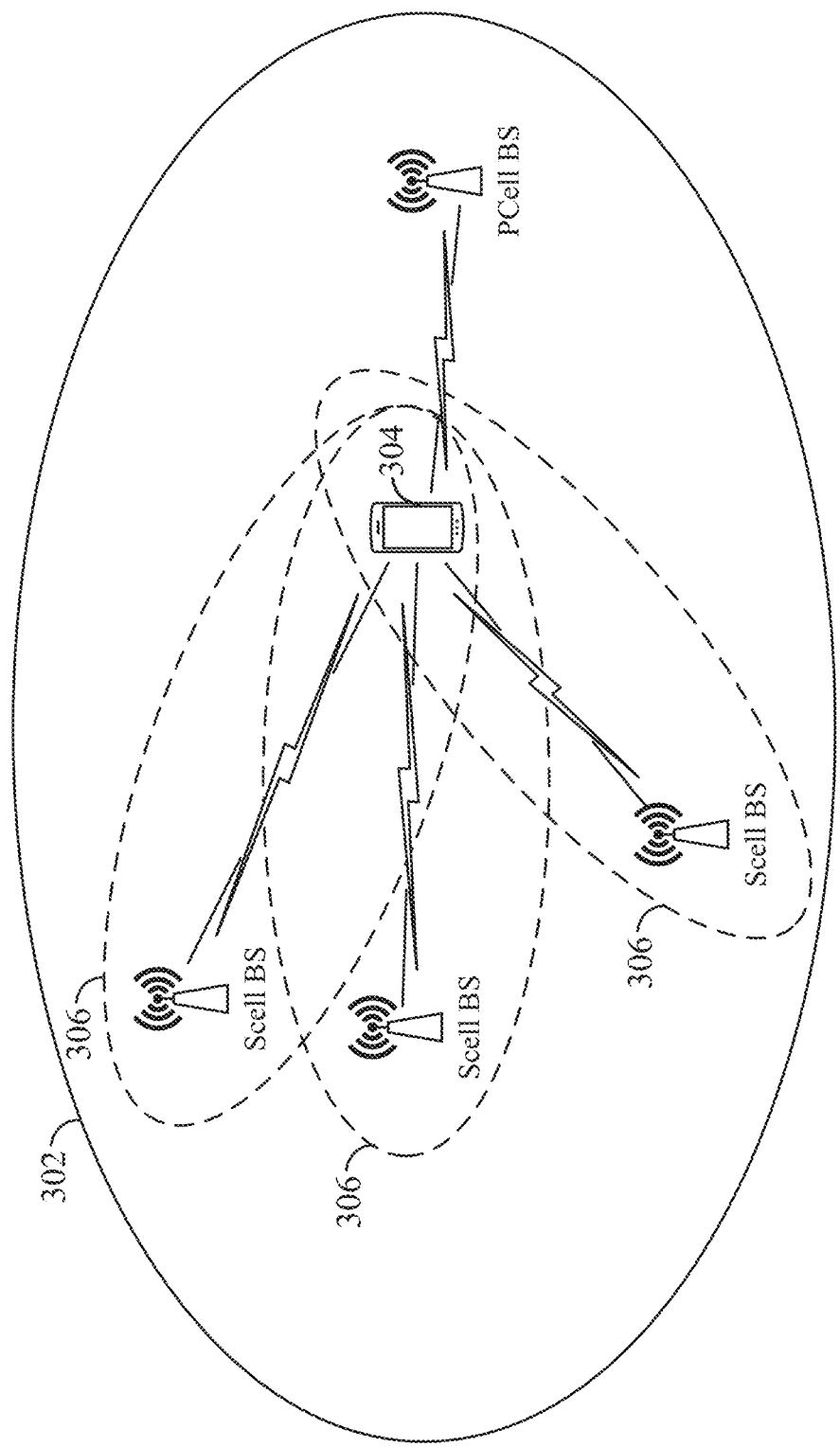
FIG. 3 is a conceptual illustration of an exemplary carrier aggregation (CA) configuration using a primary cell and three secondary cells according some aspects of the present disclosure.

FIG. 3 is a diagram illustrating an exemplary carrier aggregation (CA) configuration including a primary cell (PCell) and three secondary cells (SCells) in accordance with some aspects of the disclosure. The PCell 302 may be called an anchor cell that provides a radio resource control (RRC) connection to a UE 304. When CA is configured, one or more SCells 306 may be activated and combined with the PCell 302 to form the serving cells for the UE 304. Each serving cell communicates with the UE using a corresponding component carrier (CC). The CC of the PCell may be called a primary CC, and the CC of an SCell may be called a secondary CC. In some examples, multiple CCs may be associated with the same cell. Each of the PCell and SCells may be served by a base station (e.g., gNB or eNB) or scheduling entity 108 similar to those illustrated in FIGS. 1 and 2. In some examples, the PCell 302 may be a low band cell (e.g., sub-6 GHz), and the SCells 306 may be high band cells. A low band (LB) cell uses a CC in a frequency band lower than that of the high band cells. For example, the high band cells may use mmW CCs, and the low band cell may use a CC in a band (e.g., sub-6 GHz band) lower than mmW. In general, a cell using a mmW CC provides greater bandwidth than a cell using a low band CC. In some aspects of the disclosure, the different cells (e.g., PCell and SCells) may be provided by the same base station.

In some aspects of the disclosure, a UE 304 may initially camp on the LB PCell 302 and is not connected to the SCells 306. When the network has a large amount of data destined to the UE, the LB PCell may opportunistically activate one or more SCells 306 to provide additional bandwidth to the UE 304. In one example, the UE 304 may be in an idle mode and monitors for page messages from the PCell that may contain a wake-up or activation trigger of the SCells 306. The wake-up trigger causes the UE to wake up and connect with the PCell 302 and one or more SCells 306. In another example, the UE 304 already has an active connection (e.g., connected mode) with the PCell 302 that can opportunistically activate one or more CCs of the SCells 306 to handle a large amount of data destined to the UE. In another example, the UE 304 is already active in both the PCell 302 and one or more SCells 306, and the UE reconfigures the active CCs to a new set of SCells that are broadcasted by the network.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a predetermined duration (e.g., a duration of 10 ms) for wireless transmissions, with each frame consisting of a predetermined number of subframes (e.g., 10 subframes of 1 ms each). On a given carrier, there may be one set of frames in the UL, and another set of frames in the DL. Referring now to FIG. 4, an expanded view of an exemplary subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example. In some examples, some RBs 408 may be allocated to component carriers of one or more SCells to support CA configurations.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
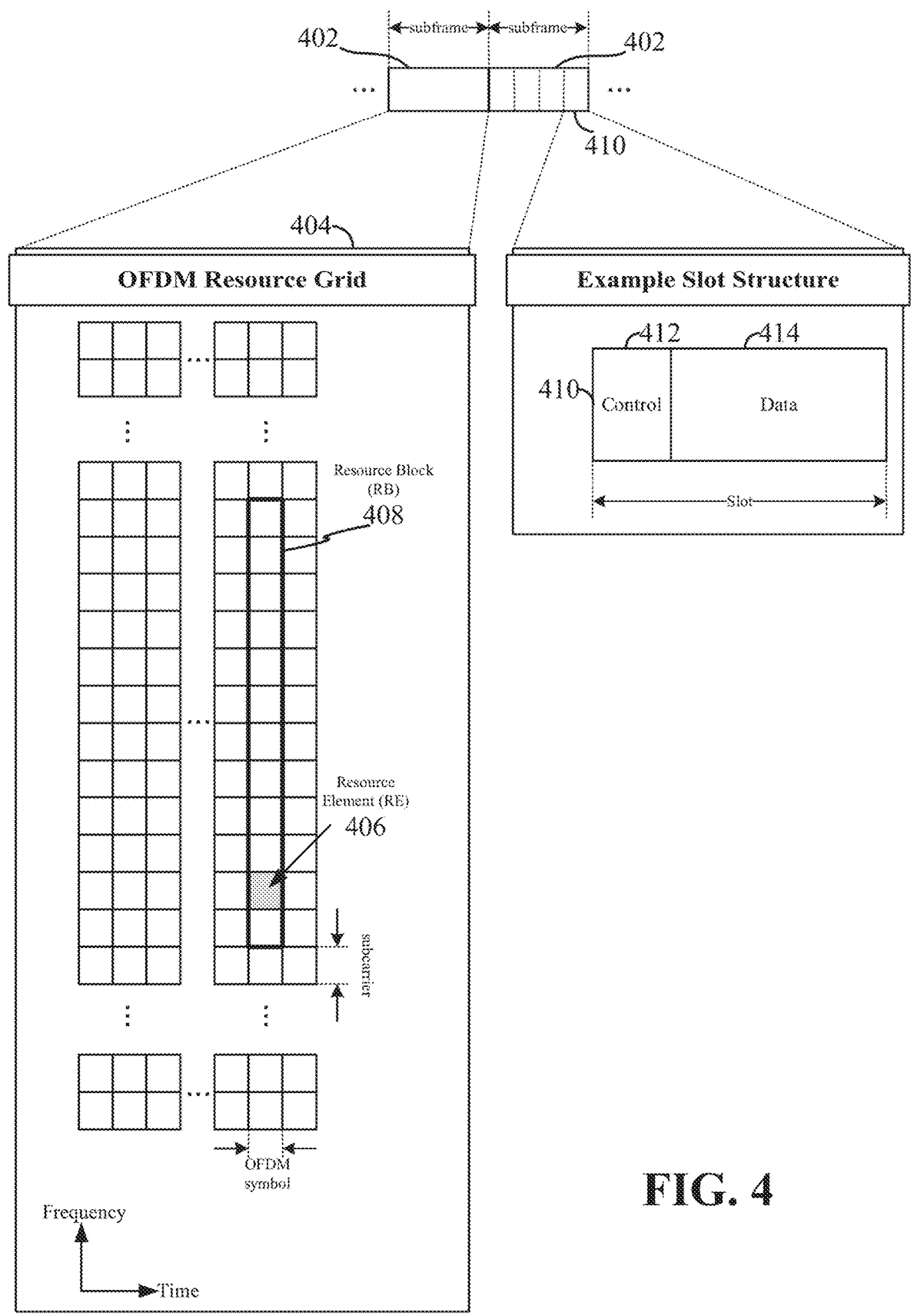
FIG. 4 is a schematic illustration of an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, reference signals, etc. Other REs 406 within the RB 408 may also carry pilots or reference signals, including but not limited to a demodulation reference signal (DMRS) a control reference signal (CRS), a sounding reference signal (SRS), or UE-specific reference signal. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
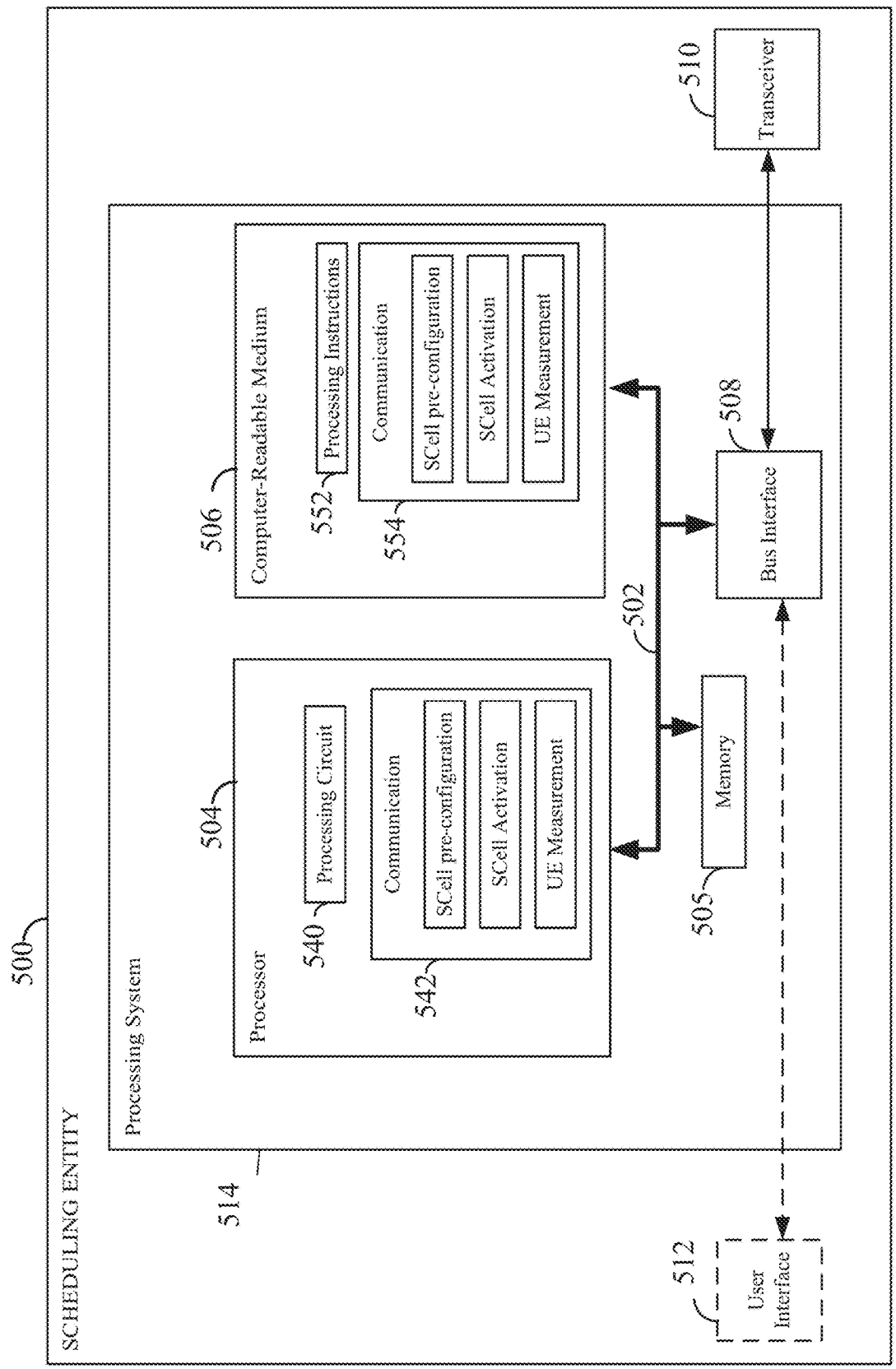
FIG. 5 is a block diagram conceptually illustrating an example of a hardware implementation for a scheduling entity according to some aspects of the disclosure.

FIG. 5 is a block diagram illustrating an example of a hardware implementation for a scheduling entity 500 employing a processing system 514. For example, the scheduling entity 500 may be a user equipment (UE) as illustrated in any one or more of FIGS. 1, 2, 3, 8, and/or 11. In another example, the scheduling entity 500 may be a base station as illustrated in any one or more of FIGS. 1, 2, 3, 8, and/or 11.

The scheduling entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be used to implement any one or more of the processes and procedures described below and illustrated in relation to FIGS. 7-13.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided. Of course, such a user interface 512 is optional, and may be omitted in some examples, such as a base station.

In some aspects of the disclosure, the processor 504 may include circuitry configured for various functions, including, for example, carrier aggregation with accelerated SCell activation. For example, the circuitry may include a processing circuit 540 and a communication circuit 542 configured to implement one or more of the functions described below in relation to FIGS. 7-13. The communication circuit 542 may include an SCell pre-configuration block configured to perform various functions related to determining, selecting, and configuring one or more SCells to facilitate a fast or accelerated SCell activation procedure described below. The communication circuit 542 may include an SCell activation block configured to control SCells activation/deactivation, for example, using an accelerated SCell activation procedure. The communication circuit 542 may include a UE measurement block configured to perform functions related to UE measurement of SCells to facilitate the accelerated SCell activation procedure.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may include software configured for various functions, including, for example, carrier aggregation with accelerated SCell activation. For example, the software may include processing instructions 552 and communication instructions 554 configured to implement one or more of the functions described below in relation to FIGS. 7-13. The communication instructions 554 may include SCell pre-configuration instructions configured to perform various functions related to determining, selecting, and configuring one or more SCells to facilitate an accelerated SCell activation procedure described below. The communication instructions 554 may include SCell activation instructions configured to control SCells activation/deactivation in the accelerated SCell activation procedure. The communication instructions 554 may include UE measurement instructions configured to perform functions related to UE measurement of SCells to facilitate the accelerated SCell activation procedure.

Figure 6:
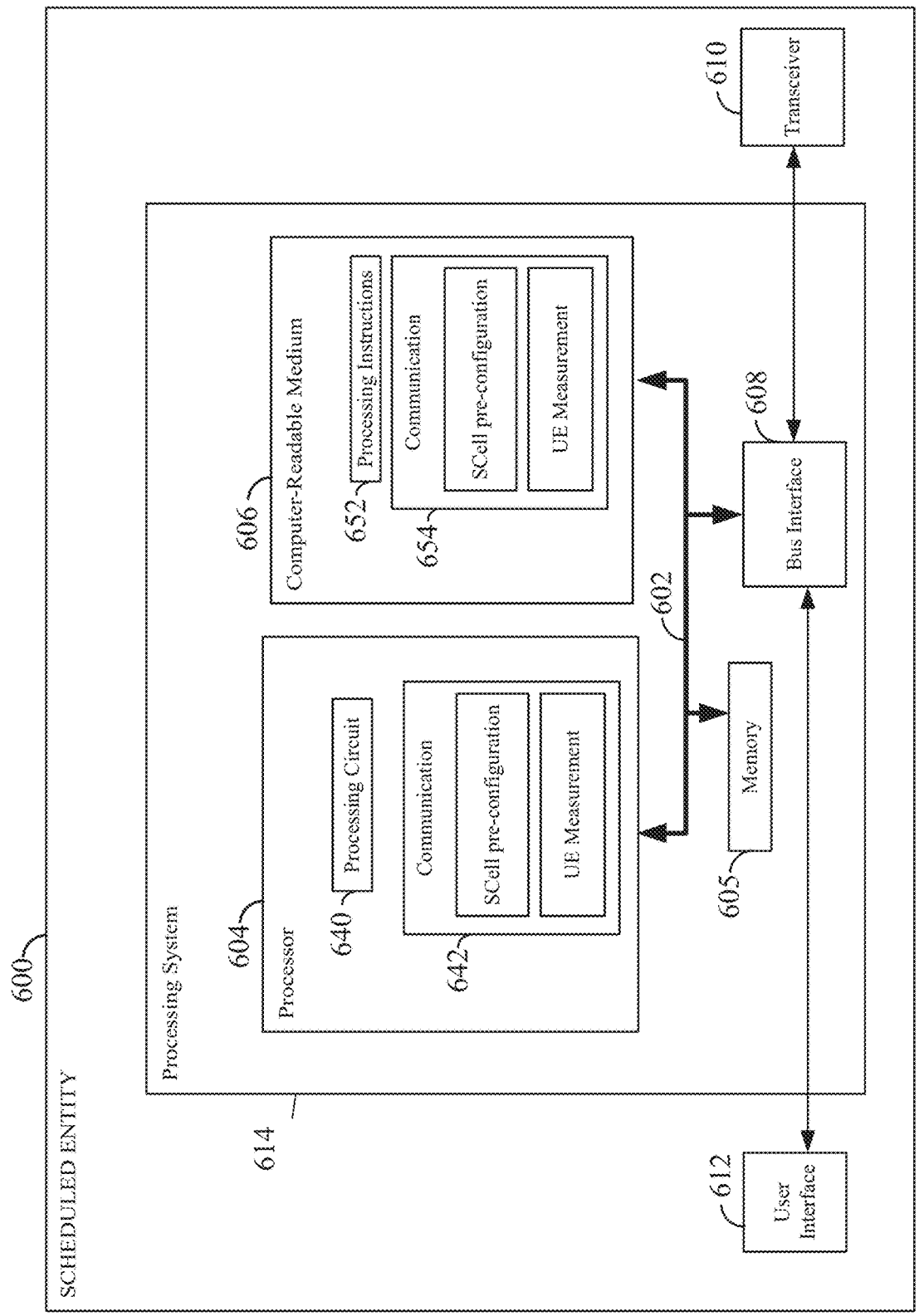
FIG. 6 is a block diagram conceptually illustrating an example of a hardware implementation for a scheduled entity according to some aspects of the disclosure.

FIG. 6 is a conceptual diagram illustrating an example of a hardware implementation for an exemplary scheduled entity 600 employing a processing system 614. In accordance with various aspects of the disclosure, an element, or any portion of an element, or any combination of elements may be implemented with a processing system 614 that includes one or more processors 604. For example, the scheduled entity 600 may be a user equipment (UE) as illustrated in any one or more of FIGS. 1, 2, 3, 8, and/or 11.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. That is, the processor 604, as utilized in a scheduled entity 600, may be used to implement any one or more of the processes and procedures described below and illustrated in relation to FIGS. 7-13.

In some aspects of the disclosure, the processor 604 may include circuitry configured for various functions, including, for example, carrier aggregation with accelerated SCell activation. For example, the circuitry may include a processing circuit 640 and a communication circuit 642 configured to implement one or more of the functions described below in relation to FIGS. 7-13. The communication circuit 642 may include an SCell pre-configuration block configured to perform various functions related to determining and selecting one or more SCells based on an SCell pre-configuration to facilitate a fast or accelerated SCell activation procedure described below. The communication circuit 642 may include a UE measurement block configured to perform functions related to UE measurement of SCells to facilitate the accelerated SCell activation procedure.

In some aspects of the disclosure, the computer-readable medium 606 may include software configured for various functions, including, for example, carrier aggregation with accelerated SCell activation. For example, the software may include processing instructions 652 and communication instructions 654 configured to implement one or more of the functions described below in relation to FIGS. 7-13. The communication instructions 654 may include SCell pre-configuration instructions configured to perform various functions related to determining and selecting one or more SCells based on an SCell pre-configuration to facilitate a fast or accelerated SCell activation procedure described below. The communication instructions 654 may include UE measurement instructions configured to perform functions related to UE measurement of SCells to facilitate the accelerated SCell activation procedure.

Figure 7:
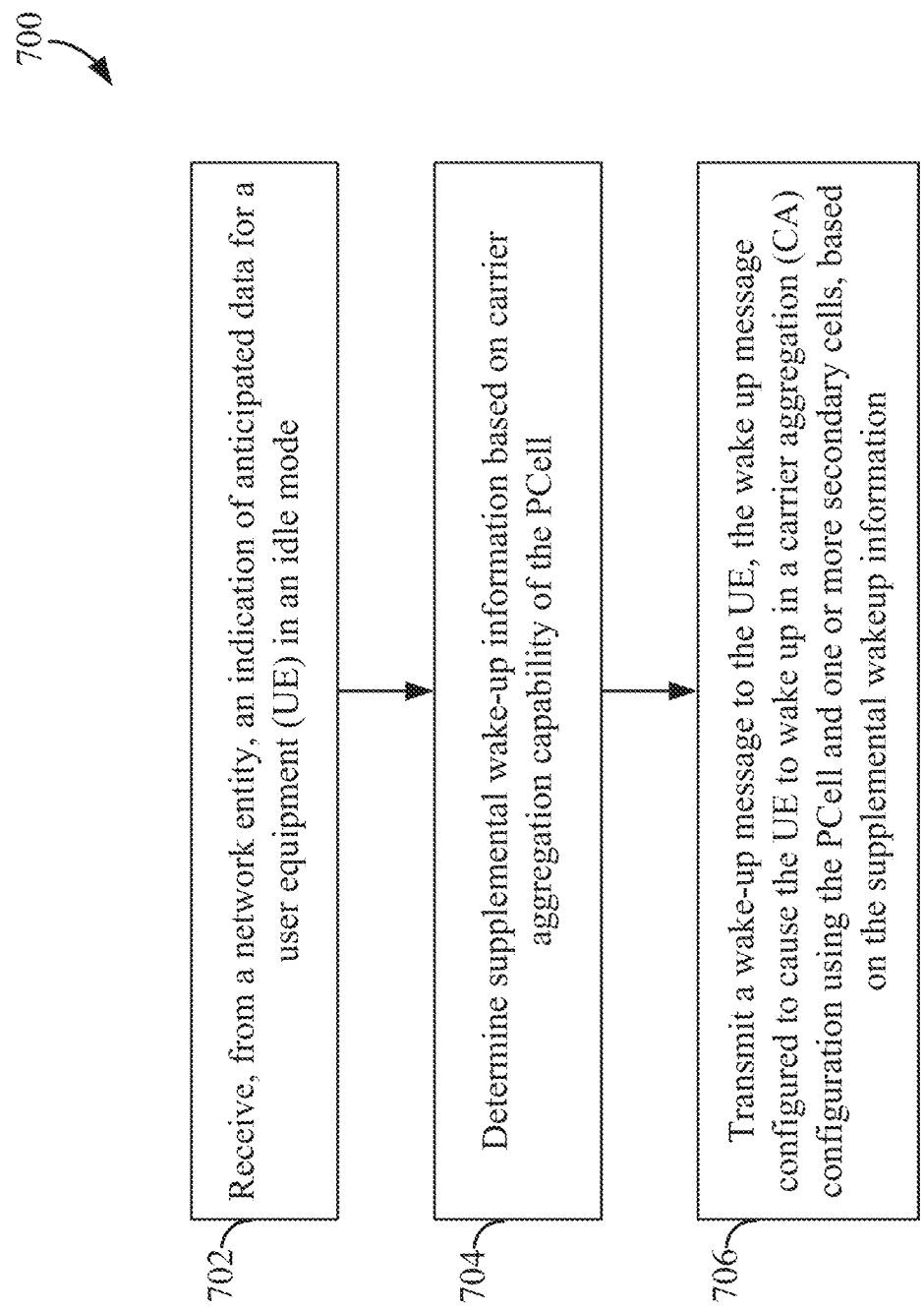
FIG. 7 is a flow chart illustrating an exemplary process for controlling carrier aggregation using accelerated secondary cell (SCell) activation according to some aspects of the disclosure.

FIG. 7 is a flow chart illustrating an exemplary process 700 for controlling carrier aggregation in accordance with some aspects of the present disclosure. As described below, some or all illustrated features may be omitted in a particular implementation within the scope of the present disclosure, and some illustrated features may not be required for implementation of all embodiments. In some examples, the process 700 may be carried out by the scheduling entity 500 illustrated in FIG. 5. In some examples, the process 700 may be carried out by any suitable apparatus or means for carrying out the functions or algorithm described below.

Figure 8:
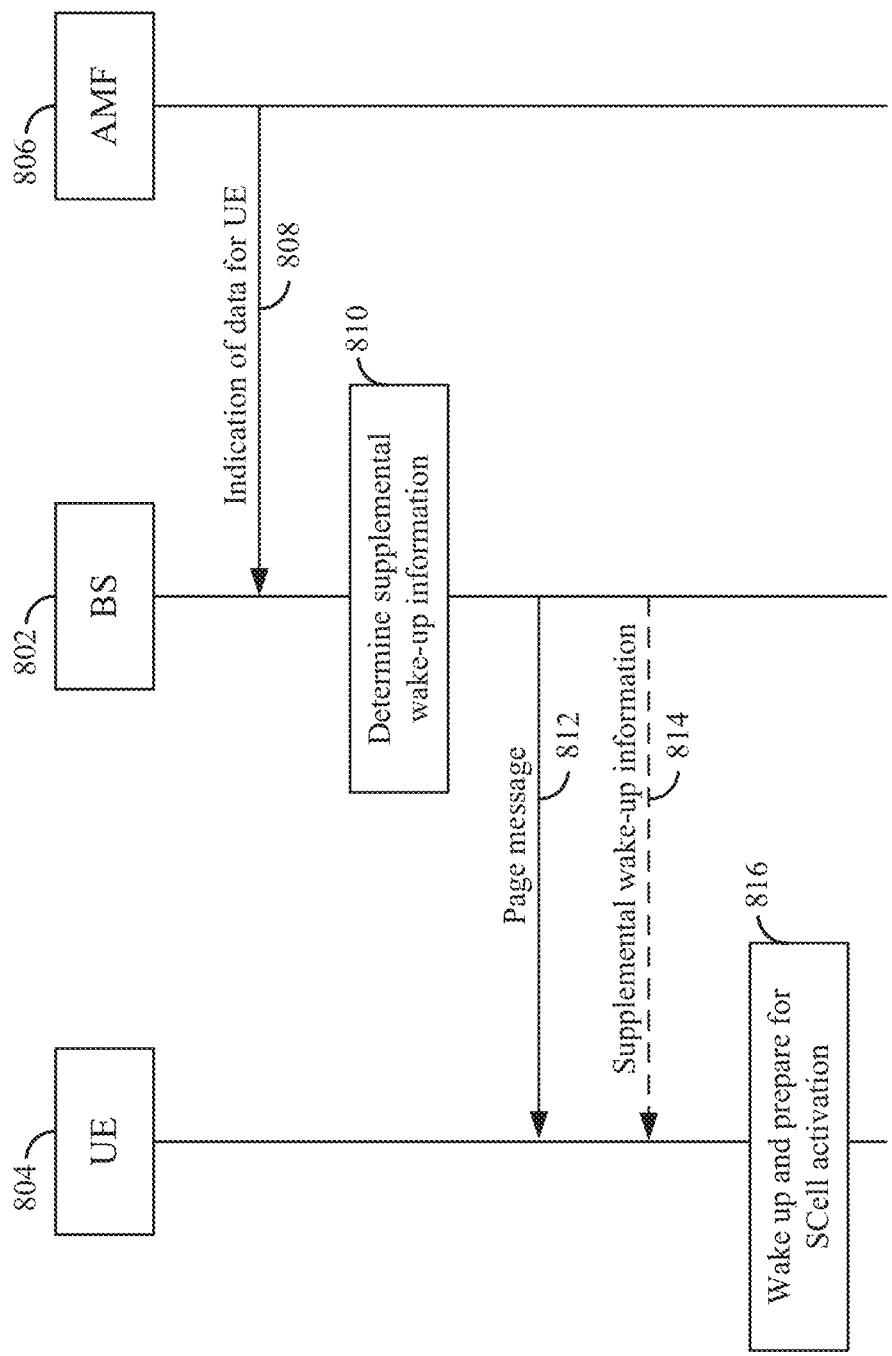
FIG. 8 is a diagram illustrating exemplary paging procedure for accelerated SCell activation according to some aspects of the disclosure.

At block 702, the scheduling entity receives, from a network entity, an indication of anticipated data for a user equipment (UE) in an idle mode. Referring to FIG. 8, the scheduling entity may be a base station 802 (e.g., gNB) of a primary cell (PCell), and a UE 804 may be camped on the PCell in an idle mode and monitors page messages from the PCell for wake-up occasions. In some examples, the network entity may be an Access and Mobility Management function (AMF) 806, which has some downlink (DL) data for the UE 804. To that end, the AMF 806 may send a message 808 to the BS 802 (i.e., scheduling entity) to indicate availability of DL data destined to the UE 804. The scheduling entity may use the communication circuit 542 and transceiver 510 to receive the message 808 from the AMF 806.

At block 704, the scheduling entity determines supplemental wake-up information based on the carrier aggregation capability of the PCell. If the amount of DL data is greater than a certain amount, it may be more efficient to wake up the UE in a CA configuration using an accelerated SCell activation procedure. In one example, the trigger for accelerated SCell activation may be a quantity of data exceeding a threshold (e.g., 100 MB) and/or a particular application that generates the data (e.g., video conferencing or video file transfer/download). The supplemental wake-up information enables the UE to wake up in a state ready to perform an accelerated SCell activation procedure. For example, in block 810 of FIG. 8, the BS 802 (scheduling entity) may use the communication circuit 542 (e.g., SCell pre-configuration block) to determine the supplemental wake-up information based on UE contexts and CA capability of the BS 802. The BS 802 may receive the UE contexts from the AMF 806. The UE contexts may indicate the UE's CA capability, for example, bands, carriers, and bandwidth parts supported in one or more CA configurations. The UE contexts may also indicate the UE's supported beam recovery and training configuration. Based on the CA capability of the BS and UE, the supplemental wake-up information may provide information for activating specific SCells for CA.

At block 706, the scheduling entity uses the transceiver 510 to transmit a wake-up message to the UE. The wake up message is configured to cause the UE to wake up in a carrier aggregation (CA) configuration using the PCell and one or more SCells, based on the supplemental wakeup information. In one example, referring to FIG. 8, the wake-up message may be a page message 812 that causes the UE to wake up in a certain CA configuration using certain band combinations, subcarriers, and bandwidth parts (if applicable). In this case, the page message 812 may provide the supplemental wakeup information. The page message 812 may also indicate a fast beam recovery and/or training configuration. In response to the page message 812, the UE wakes up and performs an accelerated SCell activation procedure (block 816 of FIG. 8) based on the supplemental wake-up information.

In some aspects of the disclosure, the BS 802 may use the transceiver 510 to transmit the supplemental wake-up information to the UE 804 in a message 814 subsequent to the page message 812. In one example, the BS 802 may transmit the supplemental wake-up information in a broadcast message (e.g., SIB). In one example, the BS 802 may transmit the supplemental wake-up information in a unicast message (e.g., RRC message) destined to the UE. In some aspects of the disclosure, the BS 802 may group UEs into two paging groups, for example, a LB-only group and a LB-HB group. A LB-only group includes UEs that wake up only on the LB PCell. A LB-HB group includes UEs that wake up on LB PCell and mmW SCells. A UE may be assigned to one or both paging groups. Therefore, the BS 802 may send a page message to the LB-only group when SCell activation is not needed. When the BS 802 needs to activate SCells, the BS may send a page message for the LB-HB group.

Figure 9:
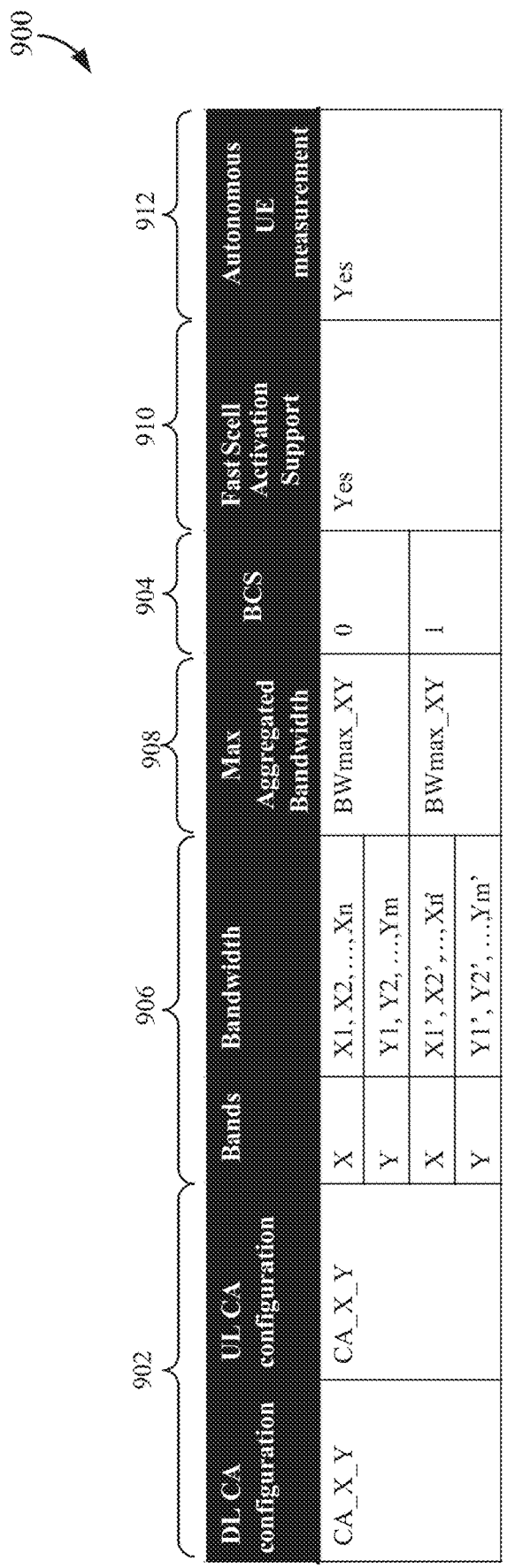
FIG. 9 is a diagram illustrating an exemplary CA configuration according to an aspect of the disclosure.

To facilitate fast or accelerated SCell activation for CA, the scheduling entity of a LB PCell may advertise its CA capability with enhanced support of accelerated SCell activation. In one example, the scheduling entity may broadcast its CA capability in an SIB or the like. FIG. 9 is a diagram illustrating an exemplary CA configuration 900 in accordance with some aspects of the present disclosure. The scheduling entity of a PCell may broadcast the CA configuration 900 in an SIB to advertise its CA capability and accelerated SCell activation support. The CA configuration 900 indicates one or more supported band combinations 902 for DL and UL. In FIG. 9, an exemplary band combination is denoted in the format of CA_X_Y, where X is the band of the PCell, and Y is the band of the SCell. In some examples, the X band may be a low band anchor CC, and the Y band may be a high band CC (e.g., mmW CC). The CA configuration 900 may indicate one or more bandwidth combination sets 904. For each bandwidth combination set (BCS), the CA configuration 900 indicates the bands, bandwidths 906 and maximum aggregated bandwidth 908 that can be used for a particular BCS. In other examples, the CA configuration 900 may have other CA configurations in addition to the CA_X_Y configuration shown in FIG. 9. In some examples, the CA configuration may be denoted as CA_X_Y_Z that includes a PCell CC (X) and two SCell CCs (Y, Z).

The CA configuration 900 may indicate accelerated SCell activation support 910 (e.g., yes or no) for the supported BCS. In some aspects of the disclosure, the CA configuration 900 may indicate support of autonomous UE measurements 912 for the supported BCS. For example, if the PCell advertises support for autonomous UE measurements for certain band combinations, the UE may report its capability to perform such autonomous UE measurements. The UE may report its autonomous measurement preference or support for specific bands using a UE capability reporting message. The network may store the UE capability information, for example, as UE context. For certain bands (e.g., mmW CC that may be used with an associated anchor low band CC), the UE may autonomously measure the SCell signal quality (e.g., Reference Signal Received Power (RSRP) and Reference Signal Received Quality (RSRQ)) without an explicit measurement trigger from the PCell. In some aspects of the disclosure, the UE may report such autonomous cell measurements to the PCell (e.g., using an anchor UL CC) to facilitate the accelerated SCell activation procedure that is described in more detail below in relation to FIGS. 7-13 below.

Figure 10:
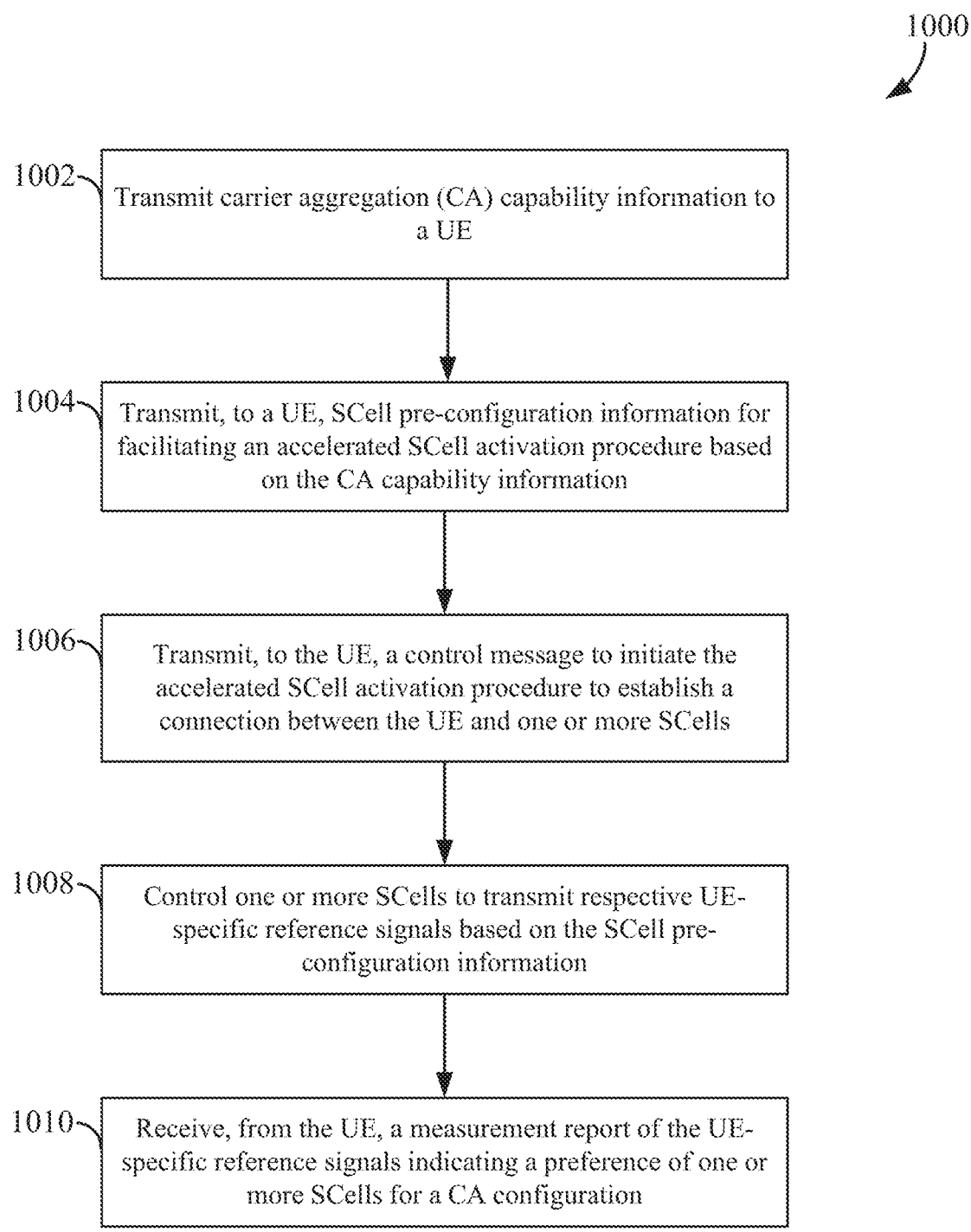
FIG. 10 is a flow chart illustrating an exemplary process for configuring carrier aggregation using an accelerated SCell activation procedure according to some aspects of the disclosure.

FIG. 10 is a flow chart illustrating an exemplary process 1000 for configuring carrier aggregation using an accelerated secondary cell activation procedure in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the scheduling entity 500 illustrated in FIG. 5. In some examples, the process 1000 may be carried out by any suitable apparatus or means for carrying out the functions or algorithm described below.

At block 1002, a scheduling entity transmits carrier aggregation (CA) capability information to a UE. The CA capability information may be similar to the CA configuration 900 described above that indicates the CA capability of the scheduling entity. The scheduling entity may receive UE capability information from the UE. The UE capability information may indicate the UE's ability to utilize CA. In one example, the scheduling entity may be a base station (e.g., gNB) of a LB PCell 302 (see FIG. 3). The scheduling entity may use the transceiver 510 to transmit CA capability information to and receive UE capability from the UE.

At block 1004, the scheduling entity transmits SCell pre-configuration information to the UE to facilitate an accelerated SCell activation procedure. In one example, the scheduling entity may use the communication block 542 (e.g., SCell pre-configuration block) to transmit the SCell pre-configuration information. An exemplary accelerated SCell activation procedure is described in more detail in relation to FIG. 11 below. The accelerated SCell activation procedure may reduce SCell access latency and LB uplink signaling overhead. To facilitate accelerated SCell activation, the SCell pre-configuration information provides the UE with certain SCell information to quickly detect and measure the SCell(s) for configuring CA.

At block 1006, the scheduling entity may use the communication circuit 542 (e.g., SCell activation block) to transmit a control message to the UE to initiate the accelerated SCell activation procedure to establish a connection between the UE and one or more SCells based on the SCell pre-configuration information. For example, the SCell pre-configuration information may describe the CCs or channels of the SCells, a timing offset between the PCell and each of the SCells, locations of synchronization signals of the SCells, UE-specific reference signal configuration information, and/or SCell measurement object configuration for UE autonomous measurements. The SCell pre-configuration information allows the UE to specifically detect, measure, and connect with the one or more SCells defined in the SCell pre-configuration information.

At block 1008, the scheduling entity uses the communication circuit 542 (e.g., UE measurement block) to control (e.g., trigger or activate) the SCells to transmit respective reference signals (e.g., UE-specific reference signals) based on the SCell pre-configuration information. For example, the SCells may transmit respective UE-specific reference signals on time-frequency resources (e.g., RBs) allocated to the particular UE for CA and specified in the SCell pre-configuration information. At block 1010, the scheduling entity may receive a measurement report of the UE-specific reference signals from the UE. The measurement report indicates the best or preferred SCell(s) for a CA configuration. Based on the measurement report, the scheduling entity may configure the best or preferred SCells to be the active SCells in a CA configuration for the UE.

Figure 11:
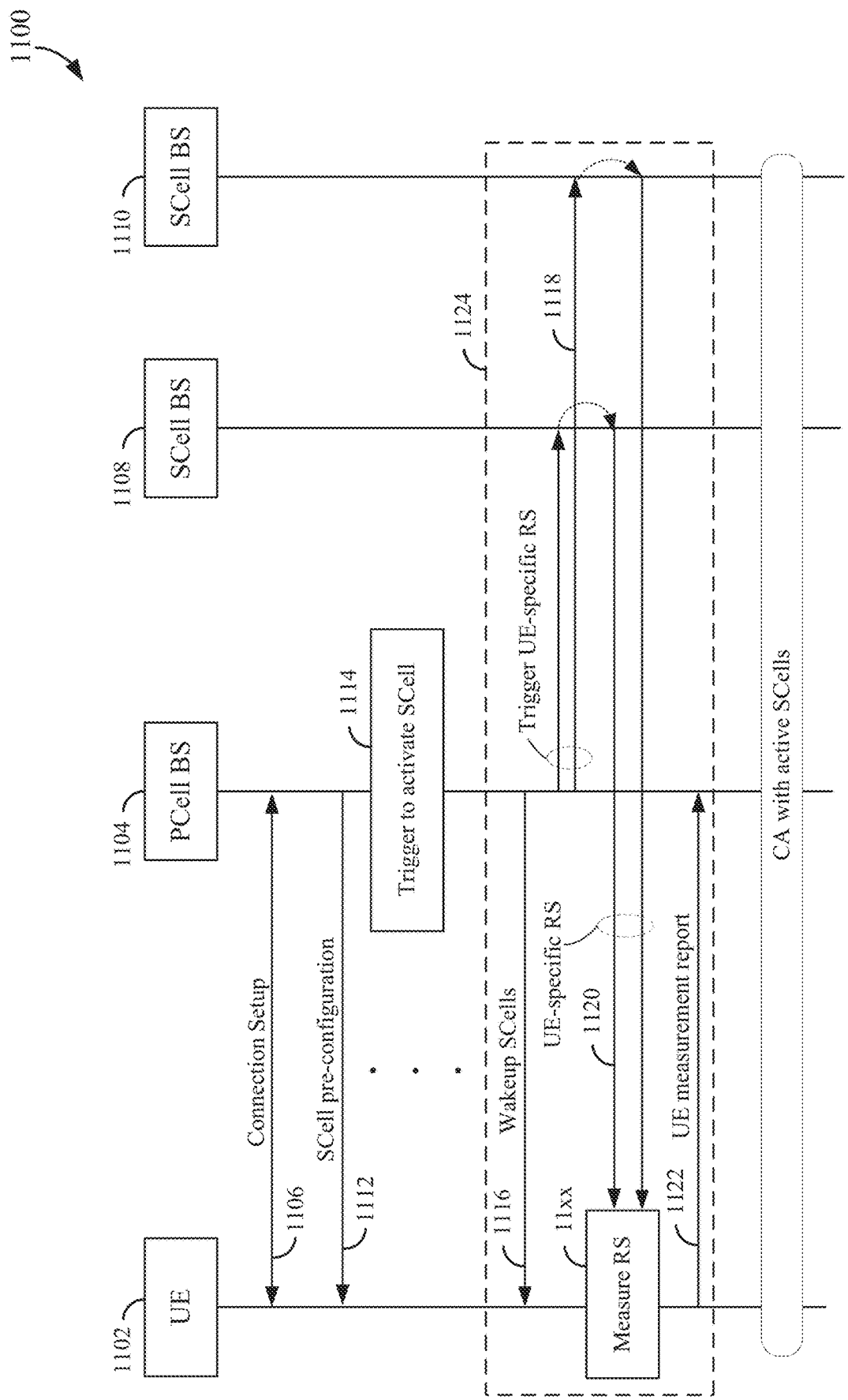
FIG. 11 is a diagram illustrating an exemplary accelerated SCell activation procedure according to some aspects of the disclosure.

FIG. 11 is a diagram illustrating an exemplary accelerated SCell activation procedure 1100 in accordance with some aspects of the present disclosure. As described below, some or all illustrated features may be omitted in a particular implementation within the scope of the present disclosure, and some illustrated features may not be required for implementation of all embodiments. In some examples, the procedure 1100 may be carried out by the scheduling entity 500 illustrated in FIG. 5 and the scheduled entity 600 illustrated in FIG. 6. In some examples, the procedure 1100 may be carried out by any suitable apparatus or means for carrying out the functions or algorithm described below.

Referring to FIG. 11, a UE 1102 may camp on a PCell BS 1104 (e.g., LB PCell) in a connected or active state after completing a connection setup procedure 1106. For example, the UE 1102 may be in an RRC_Connected state and has an active RRC connection with the PCell BS 1104 using a LB component carrier (CC). In this active state, the UE 1102 may transmit data to and receive data from the PCell BS 1104. When there is a large amount of buffered data (e.g., bursty data) destined to the UE 1102, the PCell BS 1104 may activate the one or more SCells (e.g., SCell BS 1108 and SCell BS 1110) to enable CA using an accelerated SCell activation procedure. In some examples, one or more SCells may use mmW CCs.

To facilitate accelerated or fast SCell activation for CA, the PCell BS 1104 may exchange with the UE 1102 their CA capability information during the connection setup procedure 1106. For example, the PCell BS 1104 may transmit its CA capability information (e.g., CA configuration 900) to the UE, and the UE may transmit a UE capability report to the PCell. The PCell BS 1104 may broadcast its CA capability information in a system information block (SIB) to advertise its CA capability and accelerated SCell activation support. The CA capability information may indicate one or more supported band combinations, for example, denoted in the format of CA_X_Y, wherein X is the band of the PCell, and Y is the band of the SCell. In some examples, the X band may be a low band anchor CC, and the Y band may be a mmW band CC.

In some examples, if the PCell BS advertises support for autonomous UE measurements for certain bands or band combinations, the UE may report its capability to perform such autonomous UE measurements during the connection setup procedure 1106. The UE 1102 may report its autonomous measurement preference or support for specific bands using a UE capability reporting message. The network may store the UE capability information in UE contexts. If autonomous measurement is used, the UE may autonomously measure the SCell signal quality (e.g., Reference Signal Received Power (RSRP) and Reference Signal Received Quality (RSRQ)) without an explicit measurement trigger from the PCell. In some aspects of the disclosure, the UE may report such autonomous cell measurements to the PCell (using an anchor UL CC) to facilitate accelerated SCell activation.

After connection setup, the PCell BS 1104 provides the UE with SCell pre-configuration information 1112 that facilitates accelerated SCell activation. In some examples, the PCell BS 1104 may transmit the SCell pre-configuration information to the UE 1102 in an RRC connection reconfiguration message or the like. The SCell pre-configuration information provides the UE 1102 with various SCell information to facilitate accelerated SCell activation. The PCell BS 1104 may determine the SCell pre-configuration information based on the capability of the SCells, for example, support of mmW CCs. The SCell pre-configuration information may indicate the channels or subcarriers (e.g., mmW CC) used by the SCells. For example, the SCell pre-configuration information may identify the band and carrier frequency by a channel ID or EARFCN (E-UTRA Absolute Radio Frequency Channel Number). E-UTRA stands for Evolved Universal Mobile Telecommunications System (UMTS) Terrestrial Radio Access. The SCell pre-configuration information may indicate a timing offset between the PCell and each SCell.

In some aspects of the disclosure, the SCell pre-configuration information 1112 may indicate an SCell measurement object configuration for autonomous UE measurements. For example, the UE may send compressed measurement reports to the PCell BS 1104 based on autonomous UE measurements. In one example, the UE may perform measurements using reference signals on multiple beams and measure multiple candidate SCells. Then, when the UE sends a compressed measurement report, the UE sends the best N beams on best M cells. The UE may report the best or preferred SCell(s), or a list of two or more best or preferred SCells. The ordering of the preferred SCells may be based on a predetermined measurement metric (e.g., RSRP or signal strength). In some aspects of the disclosure, the UE may not send any measurement report (even if the UE performed autonomous UE measurements) to reduce uplink signaling overhead. If the UE does not send any measurement report, then the UE may autonomously choose the preferred SCell based on UE's measurements. Then the UE may send a scheduling request using pre-configured RACH resources on the preferred SCell directly. The UE may send a message that includes the preferred SCell ID to notify the LB BS (e.g., gNB) about the SCell selection.

In some aspects of the disclosure, the PCell and activated SCells (e.g., SCells BS 1108 and 1110 in FIG. 11) form an umbrella coverage. In this case, the SCell pre-configuration information 1112 may include timing offset information that indicates the locations of UE-specific reference signal transmissions to facilitate UE measurements on the SCells to support accelerated SCell activation. In one example, the SCell pre-configuration information 1112 may include a sequence or order in which the SCells transmit their reference signals, and timing offset information indicating the start of the respective SCells reference signals. In another example, the SCell pre-configuration information 1112 may include a list of timing offsets for all SCells' reference signals. In some examples, the SCell pre-configuration information 1112 may indicate a number of transmitting (TX) beams that the SCells will sweep during their reference signal transmission. The SCell pre-configuration information 1112 may indicate a number of repetitions of the SCell reference signals, if the SCells support multiple repetitions. This may be tied to a number of receiving (RX) beams on which the UE can sweep for RX beam training.

Figure 12:
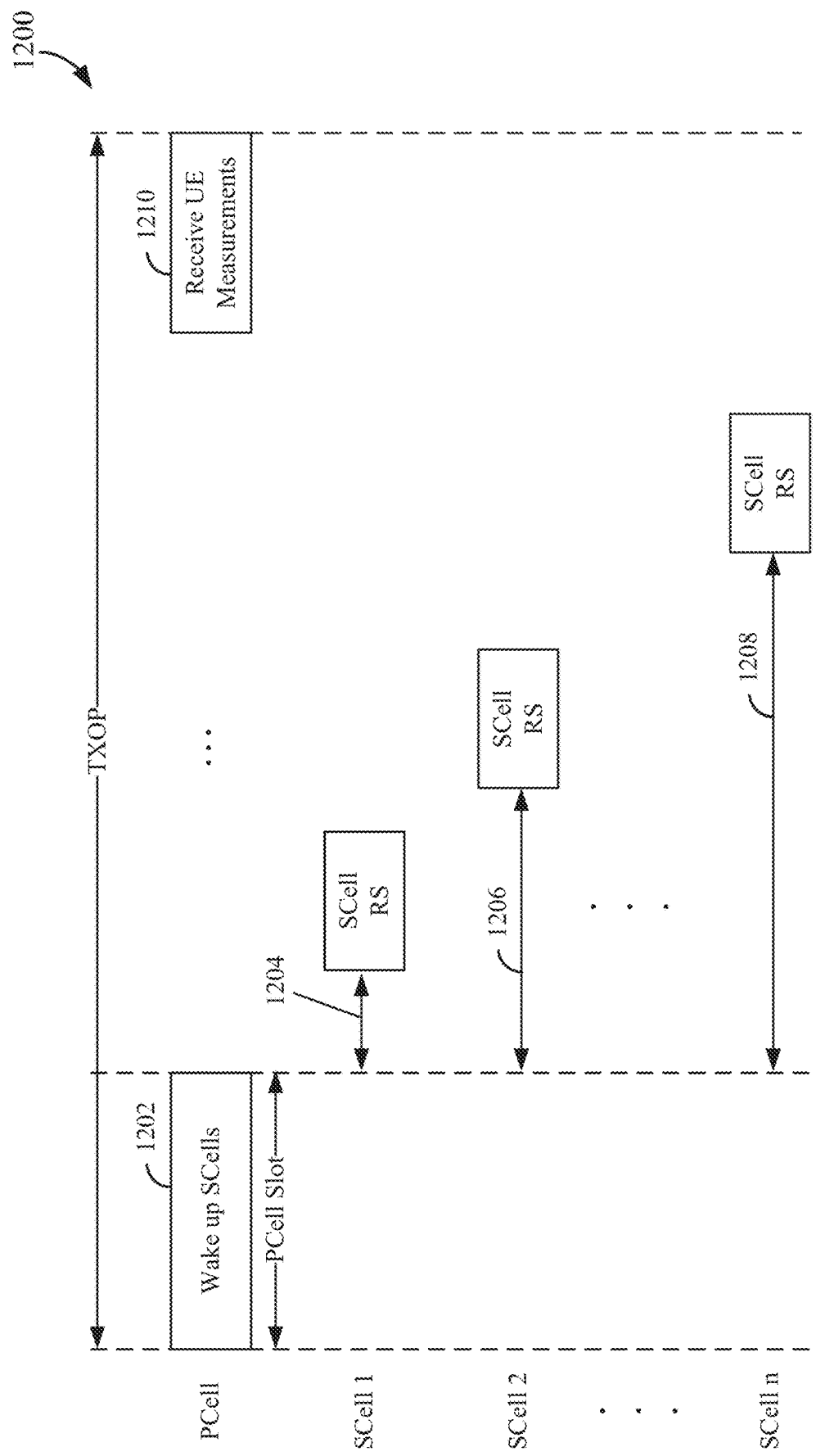
FIG. 12 is a diagram illustrating exemplary timing offsets between PCell and SCells.

FIG. 12 is a diagram illustrating exemplary timing offsets between PCell and SCells. In a PCell slot 1202, the PCell BS 1104 may configure the UE 1102 to monitor the reference signals from one or more SCells during an accelerated SCell activation procedure. In response, each SCell BS starts to transmit a reference signal (e.g., UE-specific reference signal) after a certain timing offset from the PCell slot. In some examples, the SCell BS may transmit the reference signal using beam-sweeping as indicated in an SCell pre-configuration information 1112. For example, a first SCell (e.g., SCell 1) may transmit its reference signal after a first timing offset 1204, a second SCell (e.g., SCell 2) may transmit its reference signal after a second timing offset 1206, and a third SCell (e.g., SCell n) may transmit its reference signal after a third timing offset 1208. The timing offsets may be different among the SCells. In some aspects of the disclosure, the PCell may receive the corresponding UE measurements of the reference signals within a transmission opportunity (TXOP). A TXOP refers to a predetermined period that the UE has contention-free access to a channel or CC to communicate with the PCell BS.

In some examples, the PCell BS 1104 may maintain a list of predetermined timing offsets between the PCell CC timing reference and SCell CCs timing references. In some examples, the cell timing granularity between PCell and SCells may be different. The PCell may have a longer slot duration than the SCells. In some examples, the SCell pre-configuration information 1112 may indicate the locations of synchronization signals of the SCells or other timing information. Here, the location refers to the position of the synchronization signals in the time-frequency grid of resource blocks. The SCell pre-configuration information may provide UE-specific reference signal (RS) configuration information. For example, when multiple SCells transmit their respective UE-specific reference signals, they are coordinated in a predictable or predetermined fashion so that the UE can monitor the correct reference signal at the correct time according to the SCell pre-configuration information.

After transmitting the SCell pre-configuration information 1112, the PCell BS 1104 may determine to activate CA using one or more SCells. For example, the network (e.g., AMF 806) may determine that a large amount of data (e.g., DL data) is buffered for the UE 1102. In that case, the network may send a message to the PCell BS 1104, at block 1114, to trigger the activation of one or more SCells. In response, the PCell BS 1104 may send a message 1116 to the UE 1102 to activate the SCells. For example, the PCell BS 1104 may transmit a MAC control element (CE) to the UE 1102 to activate one or more SCells. Concurrently or within a small time window (e.g., TXOP), the PCell BS 1104 transmits messages 1118 to the corresponding SCells (e.g., SCells BS 1108 and 1110). In response to the messages 1118, each SCell BS transmits its reference signal (e.g., UE-specific reference signal 1120) for cell acquisition and beam training as defined in the SCell pre-configuration information 1112.

Each SCell may transit its UE-specific reference signal 1120 in the time-frequency resources (e.g., RBs) allocated to the specific UE 1102. The UE monitors the reference signals to derive the signal quality of the corresponding channels or CCs using metrics like RSRP, RSRQ or the like. After the UE 1102 measured the UE-specific reference signals 1120, the UE may send a measurement report 1122 to the PCell BS 1104 to indicate the best or preferred SCell(s). The UE measurement report 1122 may indicate the UE's ability to use the SCell(s) for UL traffic, for example, based on path loss measurements or the like. In some aspects of the disclosure, the UE may complete the measurements and transmits the measurement report 1122 within the same LB transmission opportunity (TXOP) 1124 after receiving the message to wakeup the SCells (e.g., the MAC control CE 1116). A TXOP may refer to a predetermined period that the UE 1102 may have contention-free access to a channel or CC to communicate with the PCell BS 1104.

In some aspects of the disclosure, the UE-specific reference signal 1120 may be a synchronization signal block (SS-block), alternate time-domain reference signal, channel state information reference signal (CSI-RS), or tracking reference signal. The PCell may choose the particular reference signal type based on various factors. For example, the PCell may choose a reference signal that was previously requested by the UE or configured by the network. The PCell may use a timer-based method to choose the reference signal. For example, if the SCell is activated within a predetermined active period, the PCell may assume UE synchronization is still valid and choose a reference signal accordingly.

In some aspects of the disclosure, the UE 1102 makes autonomous UE measurements of the SCells without being requested by the network. For example, the UE may make periodic UE measurements based on a discontinuous reception (DRX) configuration. When making UE measurements based on cell-specific reference signals (e.g., SS-block), the UE 112 may choose a preferred or best SCell based on these measurements. The UE 1102 may or may not send measurement reports to PCell gNB in a certain SCell activation procedure. When the PCell BS initiates the above described accelerated SCell activation procedure, the UE may report the preferred or best SCell(s) based on the previous autonomous measurements.

Figure 13:
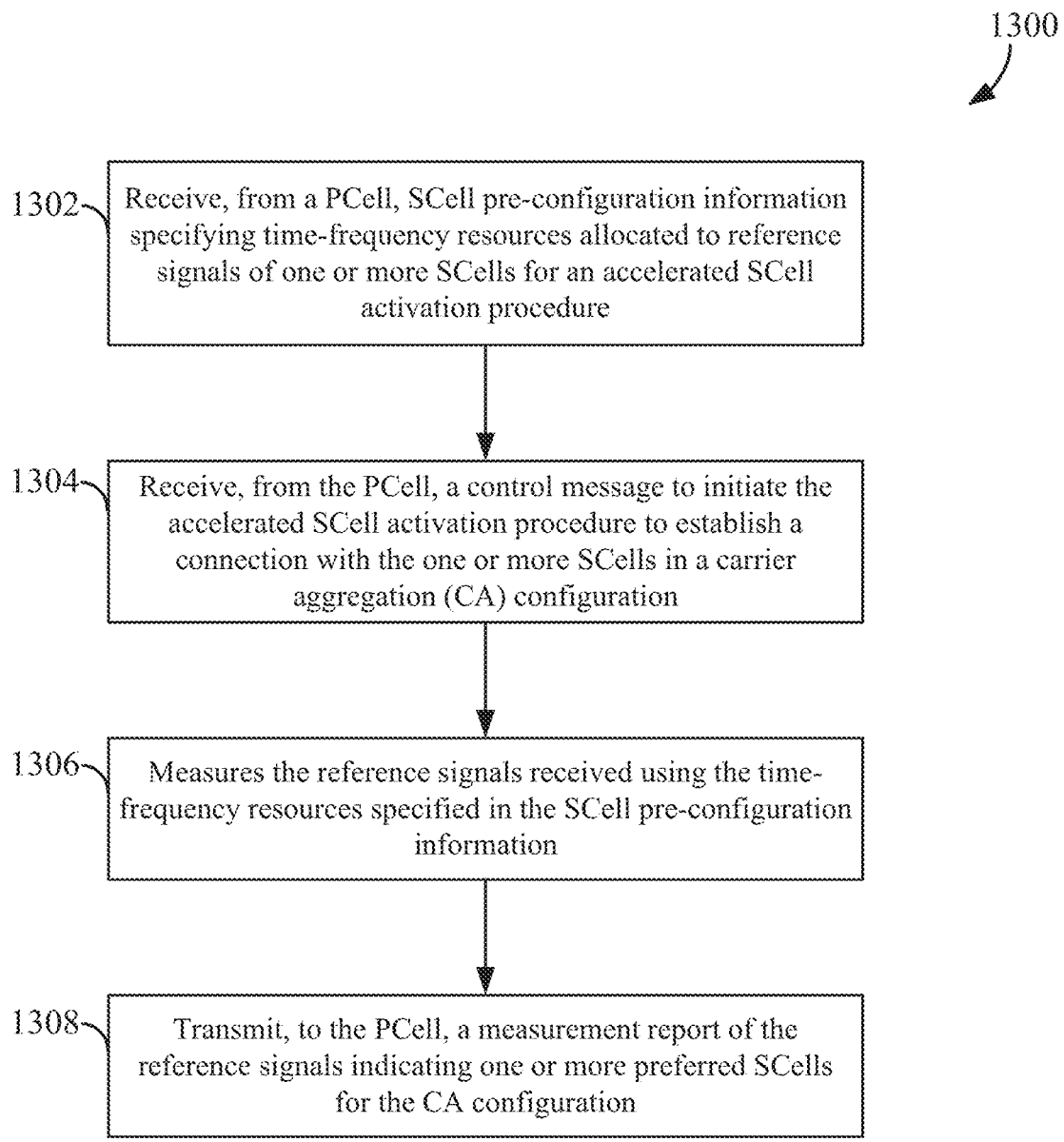
FIG. 13 is a flow chart illustrating an exemplary accelerated SCell activation procedure according to some aspects of the present disclosure.

FIG. 13 is a flow chart illustrating an exemplary accelerated secondary cell activation procedure 1300 in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduled entity 600 or UE illustrated in FIG. 6. In some examples, the process 1300 may be carried out by any suitable apparatus or means for carrying out the functions or algorithm described below.

At block 1302, the scheduled entity may use a communication circuit 642 (e.g., SCell pre-configuration block) to receive SCell pre-configuration information from a PCell (e.g., PCell BS 1104). The SCell pre-configuration information specifies time-frequency resources (e.g., RBs) allocated to reference signals of one or more SCells for an accelerated SCell activation procedure. In one example, the SCell pre-configuration information may indicate channels or CCs of the SCells, a timing offset between the PCell and each SCell, locations of synchronization signals of the SCells, UE-specific reference signal configuration information, and/or SCell measurement object configuration for UE autonomous measurements.

At block 1304, the scheduled entity may use the communication circuit 642 to receive a control message from the PCell to initiate the accelerated SCell activation procedure to establish a connection with the one or more SCells in a CA configuration. In one example, the control message may be a MAC CE. In some aspects of the disclosure, the connection between the scheduled entity and the SCell may utilize a mmW component carrier.

At block 1306, the scheduled entity may use the communication circuit 642 (e.g., UE measurement block) to measure the reference signals received using the time-frequency resources specified in the SCell pre-configuration information. In one example, the reference signals may be UE-specific reference signals or the like. At block 1308, the scheduled entity may use the communication circuit 642 to transmit a measurement report of the reference signals to the PCell. The measurement report indicates the best or one or more preferred SCells for CA configuration.

In one configuration, the apparatus 500 for wireless communication includes means for transmitting CA capability information to a UE; means for transmitting, to the UE, SCell pre-configuration information for facilitating an accelerated SCell activation procedure based on the CA capability information of the UE; means for transmitting, to the UE, a control message to initiate the accelerated SCell activation procedure to establish a connection between the UE and one or more SCells; means for controlling the SCells to transmit respective UE-specific reference signals based on the SCell pre-configuration information; and means for receiving, from the UE, a measurement report of the UE-specific reference signals indicating a preference of one or more SCells for a CA configuration. In one aspect, the aforementioned means may be the processor 504 in which the invention resides shown in FIG. 5 configured to perform the functions recited by the aforementioned means. In another aspect, the aforementioned means may be a circuit or any apparatus configured to perform the functions recited by the aforementioned means.

In one configuration, the apparatus 600 for wireless communication includes means for receiving, from a PCell, SCell pre-configuration information specifying time-frequency resources allocated to reference signals of one or more SCells for an accelerated SCell activation procedure; means for receiving, from the PCell, a control message to initiate the accelerated SCell activation procedure to establish a connection with the one or more SCells in a CA configuration; means for measuring the reference signals received using the time-frequency resources specified in the SCell pre-configuration information; and means for transmitting, to the PCell, a measurement report of the reference signals indicating one or more preferred SCells for the CA configuration.

Of course, in the above examples, the circuitry included in the processor 504/604 is merely provided as an example, and other means for carrying out the described functions may be included within various aspects of the present disclosure, including but not limited to the instructions stored in the computer-readable storage medium 506/606, or any other suitable apparatus or means described in any one of the FIGS. 1, 2, 3, 8, and/or 11, and utilizing, for example, the processes and/or algorithms described herein in relation to FIGS. 7-13.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps escribed herein.

The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a scheduling entity of a primary cell (PCell), comprising:
    transmitting carrier aggregation (CA) capability information to a user equipment (UE);
    transmitting, to the UE, secondary cell (SCell) pre-configuration information for facilitating an accelerated SCell activation procedure based on the CA capability information of the UE;
    transmitting, to the UE, a control message to initiate the accelerated SCell activation procedure to establish a connection between the UE and one or more SCells;
    controlling the one or more SCells to transmit respective UE-specific reference signals based on the SCell pre-configuration information; and
    receiving, from the UE, a measurement report of the UE-specific reference signals indicating a preference of the one or more SCells for a CA configuration.

2. The method of claim 1, wherein the SCell pre-configuration information comprises at least one of:
    component carriers of the one or more SCells;
    a timing offset between the PCell and each of the one or more SCells;
    locations of synchronization signals of the one or more SCells;
    UE-specific reference signal configuration information; or
    SCell measurement object configuration for UE autonomous measurements.

3. The method of claim 1, wherein transmitting the SCell pre-configuration information comprises:
    transmitting the SCell pre-configuration information in a radio resource control (RRC) connection reconfiguration message.

4. The method of claim 1, wherein controlling the one or more SCells comprises:
    requesting each of the one or more SCells to transmit the respective UE-specific reference signal using time-frequency resources specified in the SCell pre-configuration information.

5. The method of claim 4, wherein controlling the one or more SCells comprises:
    controlling the one or more SCells to transmit the respective UE-specific reference signals at respective predetermined timing offsets based on the SCell pre-configuration information.

6. The method of claim 1, further comprising selecting the respective UE-specific reference signals based on at least one of:
    a previously requested reference signal; or
    a predetermined active period in which UE synchronization is valid.

7. The method of claim 1, wherein the CA capability information is configured to indicate the one or more SCells that are capable of performing the accelerated SCell activation procedure.

8. The method of claim 1, further comprising:
    communicating with the one or more SCells to determine the SCell pre-configuration information.

9. A method of wireless communication at a user equipment (UE), comprising:
    receiving, from a primary cell (PCell), secondary cell (SCell) pre-configuration information specifying time-frequency resources allocated to reference signals of one or more secondary cells (SCells) for an accelerated SCell activation procedure;
    receiving, from the PCell, a control message to initiate the accelerated SCell activation procedure to establish a connection with the one or more SCells in a carrier aggregation (CA) configuration;
    measuring the reference signals received using the time-frequency resources specified in the SCell pre-configuration information; and
    transmitting, to the PCell, a measurement report of the reference signals indicating a preference of the one or more SCells for the CA configuration.

10. The method of claim 9, wherein the SCell pre-configuration information comprises at least one of:
    channels of the one or more SCells;
    a timing offset between the PCell and each of the one or more SCells;
    locations of synchronization signals of the one or more SCells;
    UE-specific reference signal configuration information; or
    SCell measurement object configuration for UE autonomous measurements.

11. The method of claim 9, wherein receiving the SCell pre-configuration information comprises:
    receiving the SCell pre-configuration information in a radio resource control (RRC) connection reconfiguration message.

12. The method of claim 9, wherein measuring the reference signals comprises:
    receiving a UE-specific reference signal from each of the one or more SCells.

13. The method of claim 12, wherein the UE-specific reference signal comprises at least one of:
- a synchronization signal block (SS-block);
- an alternate time-domain reference signal;
- a channel state information reference signal (CSI-RS); or
- a tracking reference signal.

14. The method of claim 9, further comprising:
receiving carrier aggregation (CA) capability information from the PCell, the CA capability information indicating the one or more SCells that are capable of performing the accelerated SCell activation procedure.

15. The method of claim 9, further comprising:
performing autonomous measurements of the reference signals; and
transmitting a measurement report of the autonomous measurements to the PCell.

16. A scheduling entity of a primary cell (PCell) for wireless communication, comprising:
a communication interface configured to communicate with user equipment (UE);
a memory; and
a processor operatively coupled with the memory and the communication interface,
wherein the processor and the memory are configured to:
transmit carrier aggregation (CA) capability information to the UE;
transmit, to the UE, secondary cell (SCell) pre-configuration information for facilitating an accelerated SCell activation procedure based on the CA capability information of the UE;
transmit, to the UE, a control message to initiate the accelerated SCell activation procedure to establish a connection between the UE and one or more SCells;
control the one or more SCells to transmit respective UE-specific reference signals based on the SCell pre-configuration information; and
receive, from the UE, a measurement report of the UE-specific reference signals indicating a preference of the one or more SCells for a CA configuration.

17. The scheduling entity of claim 16, wherein the SCell pre-configuration information comprises at least one of:
- component carriers of the one or more SCells;
- a timing offset between the PCell and each of the one or more SCells;
- locations of synchronization signals of the one or more SCells;
- UE-specific reference signal configuration information; or
- SCell measurement object configuration for UE autonomous measurements.

18. The scheduling entity of claim 16, wherein the processor and the memory are further configured to:
transmit the SCell pre-configuration information in a radio resource control (RRC) connection reconfiguration message.

19. The scheduling entity of claim 16, wherein the processor and the memory are further configured to:
control each of the one or more SCells to transmit the respective UE-specific reference signal using time-frequency resources specified in the SCell pre-configuration information.

20. The scheduling entity of claim 19, wherein the processor and the memory are further configured to:
control the one or more SCells to transmit the respective UE-specific reference signals at respective predetermined timing offsets based on the SCell pre-configuration information.

21. The scheduling entity of claim 16, wherein the processor and the memory are further configured to select the respective UE-specific reference signals based on at least one of:
- a previously requested reference signal; or
- a predetermined active period in which UE synchronization is valid.

22. The scheduling entity of claim 16, wherein the CA capability information is configured to indicate the one or more SCells that are capable of performing the accelerated SCell activation procedure.

23. The scheduling entity of claim 16, wherein the processor and the memory are further configured to:
communicate with the one or more SCells to determine the SCell pre-configuration information.

24. A user equipment (UE) for wireless communication, comprising:
a communication interface for wireless communication;
a memory; and
a processor operatively coupled with the memory and the communication interface,
wherein the processor and the memory are configured to:
receive, from a primary cell (PCell), secondary cell (SCell) pre-configuration information specifying time-frequency resources allocated to reference signals of one or more secondary cells (SCells) for an accelerated SCell activation procedure;
receive, from the PCell, a control message to initiate the accelerated SCell activation procedure to establish a connection with the one or more SCells in a carrier aggregation (CA) configuration;
measure the reference signals received using the time-frequency resources specified in the SCell pre-configuration information; and
transmit, to the PCell, a measurement report of the reference signals indicating a preference of the one or more SCells for the CA configuration.

25. The UE of claim 24, wherein the SCell pre-configuration information comprises at least one of:
- channels of the one or more SCells;
- a timing offset between the PCell and each of the one or more SCells;
- locations of synchronization signals of the one or more SCells;
- UE-specific reference signal configuration information; or
- SCell measurement object configuration for UE autonomous measurements.

26. The UE of claim 24, wherein the processor and the memory are further configured to:
receive the SCell pre-configuration information in a radio resource control (RRC) connection reconfiguration message.

27. The UE of claim 24, wherein the processor and the memory are further configured to receive the reference signals by:
receiving a UE-specific reference signal from each of the one or more SCells.

28. The UE of claim 27, wherein the UE-specific reference signal comprises at least one of:
- a synchronization signal block (SS-block);
- an alternate time-domain reference signal;
- a channel state information reference signal (CSI-RS); or
- a tracking reference signal.

29. The UE of claim 24, wherein the processor and the memory are further configured to:
receive carrier aggregation (CA) capability information from the PCell, the CA capability information indicating the one or more SCells that are capable of performing the accelerated SCell activation procedure.

30. The UE of claim 24, wherein the processor and the memory are further configured to:
perform autonomous measurements of the reference signals; and
transmit a measurement report of the autonomous measurements to the PCell.

\* \* \* \* \*